United States Patent [19]

Garapon et al.

[11] Patent Number: 4,731,095

[45] Date of Patent: Mar. 15, 1988

[54] NITROGEN CONTAINING COPOLYMERS USEFUL AS ADDITIVES FOR LOWERING THE CLOUD POINT OF HYDROCARBON MIDDLE DISTILLATES AND COMPOSITIONS CONTAINING THEM

[75] Inventors: Jacques Garapon, Lyons; Bernard Sillion, Rocquencourt; Bernard Damin, Oullins; Robert Leger, Grigny, all of France

[73] Assignees: Institut Francais du Petrole, Rueil-Malmaison; Elf France, Paris, both of France

[21] Appl. No.: 776,988

[22] Filed: Sep. 16, 1985

Related U.S. Application Data

[63] Continuation-in-part of Ser. No. 500,696, Jun. 3, 1983, abandoned.

[30] Foreign Application Priority Data

Jun. 4, 1982 [FR] France ................................ 82 09908

[51] Int. Cl.$^4$ ............................. C10L 1/16; C10L 1/18
[52] U.S. Cl. ............................................ 44/62; 44/70; 44/71; 44/72; 252/51.5 A; 525/327.6; 525/329.5
[58] Field of Search ............................... 44/62, 70, 71; 525/327.6, 329.5; 252/51.5 A

[56] References Cited

U.S. PATENT DOCUMENTS

| | | | |
|---|---|---|---|
| 4,160,739 | 7/1979 | Stambaugh et al. | 44/62 |
| 4,320,019 | 3/1982 | Hayashi | 252/51.5 A |
| 4,357,250 | 11/1982 | Hayashi | 252/51.5 A |
| 4,359,325 | 11/1982 | Dawans et al. | 525/327.6 |
| 4,375,973 | 3/1983 | Rossi et al. | 44/62 |

OTHER PUBLICATIONS

Nakajima, "Fraction of Linear Polyethylene with Gel Permeation Chromatography," Polymer Mol. wts. Methods, ACS 9 Advances in Chemistry Series 125, AMCS, Wash., D.C. 1973.

Primary Examiner—William R. Dixon, Jr.
Assistant Examiner—Margaret B. Medley
Attorney, Agent, or Firm—Millen & White

[57] ABSTRACT

Copolymers with nitrogen groups are used as additives to lower the cloud point and improve the filterability limit temperature and the pour point of middle distillates such as gas oils. They are obtained by reacting a compound having a primary amine group with a copolymer comprising 15 to 40% of recurrent units from a linear α-olefin, 20 to 70% of recurrent units from and α,β-unsaturated dicarboxylic compound and 15 to 45% of recurrent units from an alkyl ester of unsaturated monocarboxylic acid.

27 Claims, No Drawings

NITROGEN CONTAINING COPOLYMERS USEFUL AS ADDITIVES FOR LOWERING THE CLOUD POINT OF HYDROCARBON MIDDLE DISTILLATES AND COMPOSITIONS CONTAINING THEM

This application is a continuation of application Ser. No. 500,696, filed June 3, 1983, now abandoned.

BACKGROUND OF THE INVENTION

This invention concerns new nitrogen-containing additives useful as agents for lowering the cloud point of hydrocarbons middle distillates (fuel-oils, gas oils) as well as the middle distillates compositions containing said additives.

The oil distillates of the invention are middle distillates (fuel oil, gas oil) distilling in the range (ASTM standard D 86-67) from 150° to 450° C. The gas oils more particularly concerned are those distilling in the range from an initial temperature comprised between 160° C. and 190° C. to a final temperature comprised between 350° C. and 390° C.

A large number of products available on the market are recommended for improving the limit filterability temperature and the pour point of oil cuts of high paraffin content, such as:

polymers basically formed of long chain olefins
co-polymers basically formed of alpha-olefins
ethylene-vinyl acetate copolymers
N-acylaminoethylesters of acid-containing polymers, or
halocarbon compounds These products act on the crystallization kinetic phenomena and modify the crystal size, thereby making possible the use of the suspension at a lower temperature without clogging of the pipes and the filters. The above-mentioned products do not change the temperature at which the first paraffin crystals become apparent. As a matter of fact it has been considered, up to now, that this temperature was dependent on the molecular weight and the formula of the paraffins and on the nature of the solvent.

The lowering of the cloud point of the middle distillates (particularly the gas oils) by means of an additive, would be of particular interest in the refinery industry since it would make it possible, without changing the distillation flowsheet, to meet the specifications, which are now evolving towards a greater severity.

It has now been discovered that certain chemical compounds which are defined hereinafter have the property, when added to middle distillates, to limit the appearance of the first paraffin crystals to a temperature lower than that at which they would appear in the absence of such additives. This property is the more unexpected as it is maintained after several heating and cooling cycles and its mechanism has not yet been explained.

This category of chemical products also has an effect on other properties of the middle distillates (particularly gas oils) by modifying the behavior of the medium containing the precipitated paraffins.

Thus the compounds recommended according to the invention have a substantial action on the filterability limit temperature and the pour point.

When the paraffin crystals, whose formation results from the cooling, have appeared, they naturally tend to gather by gravity in the bottom portion. This phenomenon, generally called sedimentation, results in the clogging of the pipes and filters and is detrimental to the convenient use of the middle distillates particularly of the gas oils. The chemical compounds recommended according to the invention are able to substantially decrease the sedimentation rate of the paraffins formed by cooling gas oils or other middle distillates.

Finally, the products recommended for their above-mentioned properties further confer to the gas oils and middle distillates to which they are added, anti-corrosion properties on metal surfaces.

SUMMARY OF THE INVENTION

As a general rule, the additives of the invention may be defined as polymer products having a number average molecular weight of about 1,000 to 10,000, obtained by condensation of one or more compounds having a primary amine group, as defined hereinafter, with a copolymer comprising:

(A)—recurrent units from at least one linear $\alpha$-olefin (B)—recurrent units derived from at least one $\alpha,\beta$-unsaturated dicarboxylic compound, as a diacid, lower alkyl diester or anhydride; and (C)—recurrent units from at least one alkyl ester of unsaturated monocarboxylic acid.

DETAILED DESCRIPTION

More particularly, the considered copolymers comprise a proportion from 15 to 40% by moles of recurrent units deriving from $\alpha$-olefins, from 20 to 70% by moles of recurrent units deriving from unsaturated $\alpha,\beta$-dicarboxylic compounds and from 15 to 40% by moles of recurrent units deriving from an alkyl ester of an unsaturated monocarboxylic acid.

The linear $\alpha$-olefins forming part of the polymers composition preferably comprise at least 16 carbon atoms. They consist advantageously of mixtures of linear $\alpha$-olefins having 20 to 24 carbon atoms, 24 to 28 carbon atoms, or of cuts containing about 20% by weight of $\alpha$-olefins with at most 28 carbon atoms and about 80% of $\alpha$-olefins of 30 carbon atoms or more. In most cases the linear $\alpha$-olefin has from 16 to 30 carbon atoms.

The $\alpha,\beta$-unsaturated dicarboxylic compounds forming part of the copolymer composition are more particularly dicarboxylic acids such as maleic acid or alkylmaleic acids, for example methylmaleic (or citraconic) acid.

These compounds may also consist of alkyl diesters of these dicarboxylic acids, particularly the methyl, ethyl or propyl diesters, or even of the anhydrides corresponding to these dicarboxylic acids. For the purpose of the invention, anhydrides are preferred, more particularly maleic anhydride.

The alkyl esters of unsaturated monocarboxylic acids are more particularly the alkyl acrylates and methacrylates of 4 to 20 carbon atoms in the alkyl group, e.g. butyl, ethylhexyl, decyl, dodecyl, hexadecyl, octadecyl and eicosyl acrylates. They also comprise the acrylates and methacrylates of alcohols industrial cuts containing as an average, 12 carbon atoms (lauryl acrylate and methacrylate) or 18 carbon atoms (stearyl acrylate or methacrylate), as well as heavier alcohol cuts, with a high content of alcohols having 20 or 22 carbon atoms.

The compound with primary amine group which is condensed with the above-described copolymers to form the additives according to the invention may comply with one of the two following general formulae:

R—Z$\{$(CH$_2$)$_{\overline{n}}$NH$\}_{\overline{m}}$H      (I)
HO—CH$_2$—R″—NH$_2$      (II)

In formula (I) R is a saturated aliphatic monovalent radical comprising 1 to 30 carbon atoms. Z, according to the case, may be an oxygen or a divalent group —NH— or —NR′—, R′ being a monovalent, preferably linear, aliphatic radical comprising 1 to 30 carbon atoms, preferably 12 to 24 carbon atoms, n is an integer from 2 to 4 and m is either zero when Z is NH or an integer from 1 to 4 in any case.

The compounds of formula (I), above, may be primary amines of formula R—NH$_2$ (in this case Z in formula (I) is a —NH— group and m is zero).

Preferably, the radical R is linear and has 12 to 24 carbon atoms. Specific examples of these amines are: dodecylamine, tetradecylamine, hexadecylamine, octadecylamine, eicosylamine and docosylamine.

The compounds of formula (I) may also be polyamines deriving from saturated aliphatic amines and having the formula:

R—NH$\{$(CH$_2$)$_{\overline{n}}$NH$\}_{\overline{m}}$H corresponding to the general formula (I) wherein Z is a —NH— group, m may range from 1 to 4 and n from 2 to 4, its preferred value being 3.

Preferably the radical R is linear and has 12 to 24 carbon atoms. Specific compounds are: N-dodecyl 1,3 diamino propane, N-tetradecyl 1,3 diamino propane, N-hexadecyl 1,3 diamino propane, N-octadecyl 1,3 diamino propane, N-eicosyl 1,3 diamino propane, N-docosyl 1,3 diamino propane, N-hexadecyldipropylene triamine, N-octadecyl dipropylene triamine, N-eicosyldipropylene triamine and N-docosyldipropylene triamine.

Compounds of formula (I) may also be polyamines of the formula:

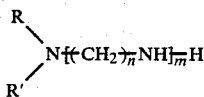

corresponding to the general formula (I) wherein Z is —NR′— and wherein R and R′, identical or different, are each an alkyl radical having 1 to 24 and preferably 8 to 24 carbon atoms, R and R′ having together preferably from 16 to 32 carbon atoms, n ranges from 2 to 4 and m from 1 to 4.

Specific compounds are N,N-diethyl 1,2 diamino ethane, N,N-diisopropyl 1,2 diamino ethane, N,N-dibutyl 1,2 diamino ethane, N,N-diethyl 1,4 diamino butane, N,N-dimethyl 1,3 diamino propane, N,N-diethyl 1,3-diamino propane, N,N-dioctyl 1,3-diamino propane, N,N-didecyl 1,3-diamino propane, N,N-didodecyl 1,3 diamino propane, N,N-ditetradecyl 1,3 diamino propane, N,N-dihexadecyl 1,3 diamino propane, N,N-dioctadecyl 1,3 diaminopropane, N,N-didodecyldipropylenetriamine, N,N-ditetradecyldipropylene triamine, N,N-dihexadecyldipropylene triamine and N,N-dioctadecyldipropylenetriamine.

Finally the compounds of formula (I) according to the invention may be ether-amines, complying more particularly with the formula:

R—O$\{$(CH$_2$)$_{\overline{n}}$NH$\}_{\overline{m}}$H corresponding to the general formula (I) wherein Z is an oxygen atom, the radical R preferably has from 12 to 24 carbon atoms, m is an integer from 1 to 4 and n an integer from 2 to 4, preferably 2 or 3.

Typical specific ether-amines compounds are: 2-methoxyethylamine, 3-methoxypropylamine, 4-methoxybutylamine, 3-ethoxypropylamine, 3-octyloxy propylamine, 3-decyloxy propylamine 3-hexadecyloxy propylamine, 3-eicosyloxy propylamine, 3-docosyloxy propylamine, N-(3-octyloxypropyl) 1,3 diamino propane, N-(3-decyloxy propyl) 1,3 diamino propane, (2,4,6-trimethyldecyl) 3-oxypropylamine and N-[(2,4,6 trimethyldecyl) 3-oxypropyl]1,3 diaminopropane.

The compound with a primary amine group involved in the preparation of the additives according to the invention may also be an aminoalcohol of formula (II):

HO—CH$_2$—R″—NH$_2$      (II)

wherein R″ is a divalent saturated aliphatic radical, linear or branched, preferably linear, having 1 to 18 carbon atoms. (In the context of this invention the term "linear" relates to unbranched as opposed to branched.)

Specific examples are: monoethanolamine, 1-amino 3-propanol, 1-amino 4-butanol, 1-amino 5-pentanol, 1-amino 6-hexanol, 1-amino 7-heptanol, 1-amino 8-octanol, 1-amino 10-decanol, 1-amino 11-undecanol, 1-amino 13-tridecanol, 1-amino 14-tetradecanol, 1-amino 16-hexadecanol, 2-amino 2-methyl 1-propanol, 2-amino 1-butanol and 2-amino 1-pentanol.

It must be understood that, without departing from the scope of the invention, it is possible to make use of one or more compounds complying with formula (I) and one or more compounds complying with formula (II).

The preparation of the additives according to the invention is generally performed in two steps: a first step of preparing the terpolymers and a second step of effecting therewith the condensation of the compound of formula (I) and/or (II).

The terpolymers may be prepared, in the first step, according to conventional techniques of radical promoted polymerization methods, for example in the presence of an initiator of the azobisisobutyronitrile or peroxide type, dissolved in a hydrocarbon solvent such as, for example, cyclohexane, isooctane, dodecane, benzene, toluene, xylene, diisopropylbenzene or even tetrahydrofuran or dioxane.

Hydrocarbon cuts of relatively high boiling point, such as a kerosene or a gas oil, will be advantageously used.

The solvent, as a general rule, will be used in such an amount that the dry material content will be from 25 to 70%, preferably about 60%.

The copolymerization reaction, in the presence of the radical initiator, is conducted at a temperature from 70° to 200° C., preferably from 80° to 130° C.

Under the operating conditions the reaction may last from 2 to 14 hours. A copolymer solution is obtained as a viscous liquid of pale yellow color.

In a second step the compound of formula (I) or (II) is condensed with the copolymer formed in the first step, in a conventional manner. To the copolymer solution obtained as above described is added, in most cases, the compound of formula (I) or (II) in a molar proportion corresponding substantially to the proportion of unsaturated diacid, diester or anhydride incorporated in the copolymer preparation. This proportion may be, for example, from 0.9 to 1.1 mole of compound (I) or (II) per mole of dicarboxylic compound.

Compound of formula (I) may also be in deficiency to a greater extent, for example in as low a proportion as 0.5 mole per mole of dicarboxylic compound incorporated in the polymer.

The reaction is performed by heating the mixture to a temperature from 75° to 130° C., preferably between 80° and 100° C., the reaction period being comprised between about 1 and 6 hours, a 2 hour period being usually sufficient. The reaction of the products of formula (I) or (II) with the recurrent units (B) of the copolymer results in the formation of the imide groups (succinimides). This reaction is accompanied by the formation of water or alcohol, according to the type of dicarboxylic recurrent unit (B) (diacid, anhydride or diester). If so desired, the formed volatile products may be discharged from the reaction mixture, either by purging with an inert gas such as nitrogen, for example, or by azeotropic distillation with the selected solvent.

Another particular way of synthesizing additives according to the invention consists, in certain cases, of performing a radical promoted copolymerization of one or more alkyl esters of unsaturated monocarboxylic acids with a mixture of α-olefins and N-substituted maleimides, the latter being obtained from a previous reaction of compounds of formula (I) or (II) with maleic anhydride or one of its above-mentioned derivatives.

The additives are obtained as a solution in the selected solvent and may be used either directly as such in oil middle distillates (particularly the gas oils) whose cloud point is to be improved.

Although the mechanism of the action of these additives on the temperature at which appear the paraffin crystals in the middle distillates has not been yet clearly elucidated, a substantial improvement of the cloud point of middle distillates treated with these additives has been observed for additive concentrations for example from 0.001 to 1% by weight and, preferably, from 0.01 to 0.2%. The lowering of the cloud point may, for example, reach 59C or more.

It is remarkable to observe that the additives according to the invention have, in addition to their efficiency in improving the cloud point of middle distillates, the further properties of inhibiting the sedimentation of the middle distillates at rest, of improving the filterability limit temperature and flow temperature and of inhibiting the corrosion of the metal surfaces in contact with said distillates.

The following examples illustrate the invention without limiting the scope thereof.

EXAMPLE 1

(a) A reactor provided with a stirring system, a cooler and an inert gas input, is fed with 73.5 g (0.75 mole) of maleic anhydride, then with 182 g (0.5 mole) of an α-olefin cut comprising about 1% of $C_{22}$ olefin, 30% of $C_{24}$ olefin, 39% of $C_{26}$ olefin, 20% of $C_{28}$ olefin and 10% of $C_{30}$ olefin with an additional amount of 200 ml of solvent formed of an oil cut distilling between 120° and 250° C. The reactor content is brought to 80° C. while stirring for one hour and then 92 g (0.5 mole) of 2-ethylhexyl acrylate and 2.5 g of benzoyl peroxide are slowly and simultaneously added thereto.

Heating of the whole mixture is continued for 12 hours at 80° C., thus producing a solution of the terpolymer as a viscous pale yellow liquid.

(b) To this solution, in the same reactor, are further added 210 g (corresponding to 0.75 molar equivalent of primary amine) of a cut of primary fatty amines whose alkyl chains comprise, as an average, 1% of $C_{14}$, 28% of $C_{16}$ and 71% of $C_{18}$; 150 ml of the solvent described in (a) are then added to obtain a dry substance content of about 60%. After 2 hours of heating at 90° C., a viscous pale yellow solution is obtained, whose infra-red spectrum shows the presence of imide bands.

This solution, adjusted with the same solvent to a dry substance content of 50% forms the "mother solution" of additive I.

EXAMPLES 2 to 7

A terpolymer according to example 1(a) is prepared and different portions thereof are subjected to the condensation with compounds having primary amine groups, the operating conditions being those described in 1(b) and the molar proportions being the same as in example 1.

EXAMPLE 2

The terpolymer prepared in accordance with 1(a) is condensed with a cut of primary fatty amines whose alkyl chains comprise about: 1% of $C_{14}$, 5% of $C_{16}$, 42% of $C_{18}$, 12% of $C_{20}$ and 40% of $C_{22}$. A solution of additive II is thus obtained.

EXAMPLE 3

The N-alkyl 1,3-diamino propane cut used in this example for the condensation with the terpolymer prepared according to 1(a), is formed of amines whose alkyl chains comprise, as an average, 1% of $C_{14}$, 28% of $C_{16}$ and 71% of $C_{18}$. The product obtained is the additive III.

EXAMPLE 4

The condensation agent used with terpolymer 1(a) is a cut of N-alkyl 1,3-diamino propane whose alkyl chains comprise about 1% of $C_{14}$, 5% of $C_{16}$, 42% of $C_{18}$, 12% of $C_{20}$ and 40% of $C_{22}$. The obtained product is additive IV.

EXAMPLE 5

The terpolymer obtained in 1(a) is condensed with 1-amino 6-hexanol. The obtained product forms additive V.

EXAMPLE 6

The cut of fatty amines used in example 1(b) is replaced with an equimolecular amount of N-[3-(2,4,6-trimethyl decyl)oxy propyl]1,3-diamino propane. The obtained product forms additive VI.

EXAMPLE 7

The cut of fatty amines used in example 1(b) is replaced with an equimolecular amount of N,N-didodecyl 1,3-diamino propane. The obtained condensation product forms additive VII.

EXAMPLES 8 and 9

In accordance with the operating conditions described in 1(a) two terpolymers are prepared which differ from that prepared in 1(a) by the nature of the α-olefin cut. These two new copolymers are condensed with the same fatty amine cut as in example 1(b) with the same operating conditions as in 1(b).

EXAMPLE 8

The α-olefin cut used to prepare the new terpolymer comprises about 1% of $C_{18}$ olefin, 49% of $C_{20}$ olefin, 42% of $C_{22}$ olefin and 8% of $C_{24}$ olefin. After condensation of the amine cut described in 1(b) additive VIII is obtained.

EXAMPLE 9

The olefin cut used to prepare the terpolymer contains about 22% of olefins having a number of carbon atoms of at most 28 and 78% of olefins having a number of carbon atoms of at least 30. The condensation product of this copolymer with the amine cut described in 1(b) forms additive IX.

EXAMPLE 10 to 13

Using the operating conditions of 1(a), terpolymers different from that prepared in 1(a) are obtained by selecting the nature and, eventually, the molar proportion of the acrylic monomer.

These new copolymers are condensed with the same amine cut as that used in 1(b), under the same operating conditions and with the same molar ratios.

EXAMPLE 10

The terpolymer is prepared by using a weight equivalent to 0.25 mole of a long chain alcohol acrylate cut, comprising about 7% of $C_{18}$ alcohol, 58% of $C_{20}$, 30% of $C_{22}$ and 3% of $C_{24}$ alcohols. After condensation according to 1(b) additive X is obtained.

EXAMPLE 11

0.5 mole of butyl acrylate is used to prepare the terpolymer; a slight overpressure of the inert gas is maintained during the polymerization reaction in order to prevent the evaporation of butyl acrylate. The amine condensation according to 1(b) provides additive XI.

EXAMPLE 12

The terpolymer is prepared by making use, everything else being unchanged, of the equivalent of 0.5 mole of a cut of various alcohol methacrylates containing, as an average, 2% of $C_{14}$ alcohol, 51% of $C_{16}$, 30% of $C_{18}$, 14% of $C_{20}$ and 3% of $C_{22}$ alcohols. The amine condensation according to 1(b) provides additive XII.

EXAMPLE 13

The terpolymer is prepared by making use of the equivalent of half a mole of a cut of alcohol methacrylates approximately of the following composition: 13% of $C_8$, 15% of $C_{10}$, 28% of $C_{12}$, 20% of $C_{14}$, 14% of $C_{16}$ and 7% of $C_{18}$. By condensation of this new terpolymer with the cut of amines used in 1(b) under the operating conditions of 1(b), additive XIII is obtained.

The above-described additives are obtained as a solution in an oil cut distilling between 120° and 250° C. Their concentration in said solution is generally adjusted to 50% of dry substance; the obtained solutions are the "mother-solutions" of these additives, the activity of which is tested by incorporating a proportion of 0.1% by weight thereof to gas oil, consisting of two gas oils from ARAMCO, referred to hereinafter as $G_1$ and $G_2$. The characteristics of these cuts are indicated in table I below:

TABLE I

| ASTM DISTILLATION | | % DISTILLED AT 350° C. | VOLUMIC MASS AT 15° C. (kg/l) |
|---|---|---|---|
| IP (°C.) | FP (°C.) | | |
| $G_1$ | 181 | 382 | 89 | 0.846 |
| $G_2$ | 186 | 385 | 87 | 0.847 |

For each of the so-formed compositions, two determinations have been effected:
 the cloud point according to the method AFNOR T 60-105, and
 the pour point according to the method AFNOR T 60-105.

The results of these determinations are reported in the following table:

TABLE II

| ADDITIVES | CLOUD POINT (°C.) | | POUR POINT (°C.) | |
|---|---|---|---|---|
| | $G_1$ | $G_2$ | $G_1$ | $G_2$ |
| none | +2 | +6 | −6 | −3 |
| 0.1% I | −1 | +1 | −12 | −12 |
| 0.1% II | 0 | +2 | −9 | −9 |
| 0.1% III | −1 | +2 | −12 | −12 |
| 0.1% IV | 0 | +2 | −12 | −12 |
| 0.1% V | 0 | +3 | −9 | −9 |
| 0.1% VI | −1 | +2 | −12 | −12 |
| 0.1% VII | −2 | +1 | −12 | −9 |
| 0.1% VIII | −1 | +2 | −12 | −12 |
| 0.1% IX | −1 | +2 | −12 | −12 |
| 0.1% X | 0 | +2 | −12 | −9 |
| 0.1% XI | −1 | +1 | −12 | −12 |
| 0.1% XII | −1 | +1 | −12 | −12 |
| 0.1% XIII | −2 | +1 | −9 | −9 |

EXAMPLE 14

(a)—a terpolymer is prepared, under the operating conditions described in example 1(a), from:
 49 g (0.5 mole) of maleic anhydride
 148 g (about 0.5 mole) of an α-olefin cut comprising 1% of $C_{18}$ α-olefin, 49% of $C_{20}$ α-olefin, 42% of $C_{22}$ α-olefin and 8% of $C_{24}$ α-olefin; and
 169 g (0.5 mole) of stearyl methacrylate.

(b)—the obtained terpolymer is condensed, in the operating conditions described in example 1(b), with 140 g (0.5 molar equivalent of primary amine) of a cut of primary fatty amines whose alkyl chains comprise, as an average, 1% of $C_{14}$, 28% of $C_{16}$ and 71% of $C_{18}$.

The obtained solution is adjusted to 50% by weight of dry substance by means of a solvent consisting of an oil cut distilling between 120° and 250° C. A "mother solution" of additive XIV is thus formed.

EXAMPLE 15 to 18

A terpolymer is prepared according to the operating conditions of example 14 and various portions of said terpolymer are subjected to a condensation with compounds having primary amine groups, in accordance with the operating mode described in 1(b) and while conforming to the molar proportions of example 14(b).

EXAMPLE 15

This example makes use of a cut of N-alkyl 1,3 diamino propane composed of amines whose alkyl chains comprise, as an average, 1% of $C_{14}$, 28% of $C_{16}$ and 71% of $C_{18}$. This operation results in the production of additive XV.

EXAMPLE 16

The terpolymer is condensed with 1-amino 11-undecanol. Additive XVI is obtained.

EXAMPLE 17

The terpolymer is condensed with 3-docosyloxy propylamine, thereby producing additive XVII.

EXAMPLE 18

The involved compound with primary amine group is N,N-dioctyl 1,3 diamino propane. The reaction product gives additive XVIII.

The activity of the additives obtained in examples 14 to 18 is tested by incorporating them to three gas oil cuts, referred to hereinafter as $G_3$, $G_4$ and $G_5$, whose characteristics are given in Table III.

TABLE III

|  | ASTM DISTILLATION | | % DISTILLED AT 350° C. | VOLUMIC MASS AT 15° C. (kg/l) |
|---|---|---|---|---|
|  | IP (°C.) | FP (°C.) | | |
| $G_3$ | 184 | 374 | 90 | 0.847 |
| $G_4$ | 205 | 375 | 87 | 0.848 |
| $G_5$ | 164 | 375 | 91 | 0.842 |

The additives are incorporated at a concentration of 0.2% by weight (and in one case of 0.1% by weight) with respect to gas oil.

On the so-formed compositions are measured the values of the cloud point, the filterability limit temperature and the pour point, respectively according to the methods AFNOR T 60-105, M 07-042 and T 60-105.

The results are collected in Table IV below:

TABLE IV

| ADDITIVES | CLOUD POINT (°C.) | | | F.L.T. (°C.) | | | POUR POINT (°C.) | | |
|---|---|---|---|---|---|---|---|---|---|
|  | $G_3$ | $G_4$ | $G_5$ | $G_3$ | $G_4$ | $G_5$ | $G_3$ | $G_4$ | $G_5$ |
| none | +3 | +3 | +4 | 0 | −1 | +2 | −6 | −6 | −6 |
| 0.1% XIV | — | −2 | −2 | — | −6 | −7 | — | −12 | −21 |
| 0.2% XIV | −3 | −3 | −3 | −9 | −9 | −10 | −21 | −15 | −21 |
| 0.2% XV | −2 | −3 | −3 | −8 | −8 | −9 | −18 | −15 | −21 |
| 0.2% XVI | −1 | −2 | −2 | −6 | −6 | −7 | −15 | −15 | −18 |
| 0.2% XVII | −1 | −1 | −1 | −5 | −5 | −6 | −15 | −15 | −18 |
| 0.2% XVIII | −1 | −1 | 0 | −4 | −5 | −6 | −12 | −12 | −15 |

EXAMPLE 19

This example has for object to test the anti-corrosion effect of the additive of example 1.

The product I has been used in the two above-described gas oils $G_1$ and $G_2$, at a concentration of 0.01% by weight.

The corrosion test consists of evaluating the corrosion induced by synthetic sea water on cylindrical test pieces of steel or polished iron according to standard ASTM D 665 modified as follows: temperature of 32.2° C. and test period of 20 hours.

With the two gas oils $G_1$ and $G_2$ containing no additives the test pieces are rusted on 100% of their surface and with the two gas oils containing 0.01% by weight of additive the test pieces are unchanged with 0% of rust.

What is claimed is:

1. A composition, useful as an additive for decreasing the cloud point of middle distillates, having a number-average molecular weight of 1,000–10,000, and being a copolymer consisting essentially of:

15–40% mole of recurrent units (A) from at least one unbranched α-olefin of at least 16 carbon atoms;

20–70% by mole of imidized recurrent units (B) from condensation, prior or subsequent to copolymerization, of at least one unsaturated α,β-dicarboxylic compound, in the form of a diacid, a lower alkyl diester or an anhydride, with at least one compound having a single primary amine group, having the formula:

$$R-Z-[(CH_2)_n-NH]_m-H \quad (I)$$
$$HO-CH_2-R''-NH_2 \quad (II)$$

wherein R is a monovalent saturated aliphatic radical having 1–30 carbon atoms, Z is O, NH or NR′, wherein R′ is a monovalent saturated aliphatic radical having 1–30 carbon atoms; n is an integer from 2 to 4; m is zero or an integer from 1 to 4 when Z is NH, or an integer from 1 to 4 when Z is O or NR″; and R″ is a divalent saturated aliphatic radical having 1–18 carbon atoms; and 15–40% by mole of recurrent units (C) from at least one alkyl ester of an unsaturated monocarboxylic acid.

2. A composition according to claim 1, wherein said linear α-olefin providing the recurrent units (A) contains 16 to 30 carbon atoms.

3. A composition according to claim 1, wherein said unsaturated α,β-dicarboxylic compound condensed to provide the imidized recurrent units (B) is at least one maleic or alkylmaleic acid, a methyl, ethyl or propyl diester thereof or a maleic or alkylmaleic anhydride.

4. A composition according to claim 1, wherein said alkyl ester of an unsaturated monocarboxylic acid providing the recurrent units (C) is at least one alkyl acrylate or methacrylate having 4–30 carbon atoms in the alkyl group.

5. A composition according to claim 1, wherein said compound having an amine group (I) is at least one linear primary amine having 12–24 carbon atoms.

6. A composition according to claim 5, wherein the linear primary amine is: dodecylamine, tetradecylamine, hexadecylamine, octadecylamine, eiscosylamine or docosylamine.

7. A composition according to claim 1, wherein said compound having an amine group (II) is at least one amino-alcohol having the formula $$HO-CH_2-R''-NH_2$$

wherein R″ is a linear or branched alkylene radical having 1 to 18 carbon atoms.

8. A composition according to claim 1, which is obtained by the steps of:

(a) effecting a radical-promoted copolymerization of appropriate proportions of said at least one linear α-olefin, said at least one unsaturated α,β-dicarboxylic compound in the form of a diacid, a lower alkyl diester or an anhydride, and said at least one alkyl ester of an unsaturated monocarboxylic acid; and (b) condensing resultant copolymer with said at least one compound having a primary amine group and having the formula (I) or (II), in a proportion of at least about 0.5 mole per mole of α,β-unsaturated dicarboxylic compound in said resultant copolymer.

9. A composition according to claim 8, wherein the proportion of said compound having a primary amine group having the formula (I) or (II) ranges from 0.9 to 1.1 mole per mole of α,β-unsaturated dicarboxylic compound in said resultant copolymer.

10. A composition according to claim 1, which is obtained by the step of effecting a radical-promoted copolymerization of appropriate proportions of said at least one linear α-olefin, said at least one imidized α,β-unsaturated dicarboxylic compound and said at least one alkyl ester of an unsaturated monocarboxylic acid, said imidized α,β-unsaturated dicarboxylic compound being at least one N-substituted imide obtained by prior reaction of an α,β-unsaturated dicarboxylic compound, in the form of a diacid, a lower alkyl diester or an anhydride, with said at least one compound having a primary amine group and having said formula (I) or (II).

11. A composition according to claim 1, wherein said compound having an amine group (I) is at least one polyamine having the formula:

$$R-NH\{(CH_2)_n NH\}_m H$$

wherein R is a linear alkyl radical having 12-24 carbon atoms, n is an integer from 2 to 4, and m is an integer from 1 to 4.

12. A composition according to claim 11, wherein said polyamine having formula (I) is N-dodecyl 1,3-diamino propane, N-tetradecyl 1,3-diamino propane, N-hexadecyl 1,3-diamino propane, N-octadecyl 1,3-diamino propane, N-eicosyl 1,3-diamino propane, N-docosyl 1,3-diamino propane, N-hexadecyldipropylene triamine, N-octadecyl dipropylene triamine, N-eicosyl dipropylene triamine or N-docosyl dipropylene triamine.

13. A composition according to claim 1, wherein said compound having an amine group (I) is at least one polyamine having the formula:

$$R-NR'\{(CH_2)_n NH\}_m H$$

wherein R and R' are each a linear alkyl radical having 8-24 carbon atoms, R and R' together having 16-32 carbon atoms, n is an integer from 2 to 4, and m is an integer from 1 to 4.

14. A composition according to claim 13, wherein said polyamine having formula (I) is 1,3-diamino propane, N,N-dioctyl N,N-didecyl 1,3-diamino propane, N,N-didodecyl 1,3-diamino propane, N,N-ditetradecyl 1,3-diamino propane, N,N-dihexadecyl 1,3-diamino propane, N,N-dioctadecyl 1,3-diaminopropane, N,N-didodecyldipropylenetriamine, N,N-ditetradecyldipropylene triamine, N,N-dihexadecyldipropylene triamine or N,N-dioctadecyldipropylene triamine.

15. A composition according to claim 1, wherein said compound having an amine group (I) is at least one etheramine having the formula:

$$R-O\{(CH_2)_n NH\}_m H$$

wherein R is an alkyl radical having 12-24 carbon atoms, n is an integer from 2 to 4, and m is an integer from 1 to 4.

16. A composition according to claim 15, wherein said ether-amine is, 3-hexadecyloxy propylamine, 3-eicosyloxy propylamine, 3-docosyloxy propylamine, (2,4,6-trimethyldecyl)3-oxypropylamine or N-[(2,4,6-trimethyldecyl)-3-oxypropyl]1,3-diaminopropane.

17. A middle distillate composition, which comprises a major proportion of middle distillate having a distillation range from 150° to 450° C. and a minor proportion of at least one compound according to claim 1, sufficient to lower the cloud point thereof.

18. A middle distillate composition according to claim 17, wherein said middle distillate is a gas oil cut having a distillation range from an initial temperature of 160° to 190° C. to a final temperature of 350° to 390° C.

19. A middle distillate composition according to claim 17, wherein the proportion of said CO polymer is from 0.001 to 1% by weight.

20. A middle distillate composition according to claim 19, wherein the proportion of said CO polymer is from 0.01 to 0.2% by weight.

21. A method of lowering the cloud point of a middle distillate composition, comprising incorporating in said middle distillate composition an effective cloud point depressant amount of a composition according to claim 1.

22. A method according to claim 21, wherein said effective amount is 0.001-1% by weight.

23. A method according to claim 22, wherein said amount is 0.01-0.2% by weight.

24. A compound, useful as an additive for decreasing the cloud point of middle distillates, having a number-average molecular weight of 1,000-10,000 and being a copolymer consisting essentially of:
  15-40% by mole of recurrent units (A) from at least one linear α-olefin of at least 16 carbon atoms;
  20-70% by mole of imidized recurrent units (B) from condensation, prior or subsequent to copolymerization, of at least one maleic or alkylmaleic acid, a methyl, ethyl or propyl diester thereof or a maleic or alkylmaleic anhydride with at least one compound having a single primary amine group; and
  15-40% by mole of recurrent units (C) from at least one alkyl ester of ann unsaturated monocarboxylic acid, wherein said alkyl ester of an unsaturated monocarboxylic acid providing the recurrent units (C) is at least one alkyl acrylate or methalcrylate having 4-30 carbon atoms in the alkyl group.

25. A compound according to claim 24, wherein said linear α-olefin providing the recurrent units (A) contains 16 to 30 carbon atoms.

26. A compound according to claim 24, wherein said at least one compound having a single primary amine group is:
  at least one primary amine having the formula R—NH$_2$ wherein R is a linear alkyl radical of 12-24 carbon atoms;
  at least one polyamine having the formula:

$$R-NH\{(CH_2)_n NH\}_m H$$

wherein R is a linear alkyl radical having 12–24 carbon atoms, n is an integer from 2 to 4, and m is an integer from 1 to 4; or at least one polyamine having the formula:

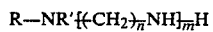

wherein R and R' are each a linear alkyl radical having 8–24 carbon atoms, R and R' together having 16–32 carbon atoms, n is an integer from 2 to 4, and m is an integer from 1 to 4; or at least one etheramine having the formula:

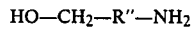

wherein R is an alkyl radical having 12–24 carbon atoms, n is an integer from 2 to 4, and m is an integer from 1 to 4; or at least one amino-alcohol having the formula $$HO-CH_2-R''-NH_2$$

wherein R'' is a linear or branched alkylene radical having 1 to 18 carbon atoms.

27. A compound according to claim 26, wherein said linear α-olefin providing the recurrent units (A) contains 16 to 30 carbon atoms.

* * * * *